US010382211B1

(12) United States Patent
Ashley et al.

(10) Patent No.: US 10,382,211 B1
(45) Date of Patent: Aug. 13, 2019

(54) APPARATUS AND METHOD FOR AUTOMATING SECURE EMAIL FOR MULTIPLE PERSONAS

(71) Applicant: Anonyome Labs, Inc., Draper, UT (US)

(72) Inventors: Paul Ashley, Queensland (AU); Steve Shillingford, Draper, UT (US); Simon Gee, Queensland (AU); John David Mumford, Portola Valley, CA (US); Greg Clark, San Francisco, CA (US)

(73) Assignee: Anonyome Labs, Inc., Draper, UT (US)

( * ) Notice: Subject to any disclaimer, the term of this patent is extended or adjusted under 35 U.S.C. 154(b) by 81 days.

(21) Appl. No.: 15/406,636

(22) Filed: Jan. 13, 2017

Related U.S. Application Data

(60) Provisional application No. 62/399,169, filed on Sep. 23, 2016.

(51) Int. Cl.
*H04L 9/08* (2006.01)
*H04L 9/32* (2006.01)
*H04L 12/58* (2006.01)

(52) U.S. Cl.
CPC ............ *H04L 9/3263* (2013.01); *H04L 9/08* (2013.01); *H04L 9/3247* (2013.01); *H04L 51/22* (2013.01)

(58) Field of Classification Search
CPC ........ H04L 9/3263; H04L 9/08; H04L 9/3247
USPC ........................................................ 713/156
See application file for complete search history.

(56) References Cited

U.S. PATENT DOCUMENTS

| | | | |
|---|---|---|---|
| 9,059,977 B2* | 6/2015 | Iwanski | H04L 63/0428 |
| 9,348,979 B2* | 5/2016 | Roundtree | G06F 21/10 |
| 2002/0087641 A1* | 7/2002 | Levosky | H04L 51/12 709/206 |

* cited by examiner

*Primary Examiner* — Jason K Gee
*Assistant Examiner* — Angela R Holmes
(74) *Attorney, Agent, or Firm* — Cooley LLP

(57) ABSTRACT

A machine has a processor and a network interface circuit connected to the processor to provide network connectivity to a client device. A memory is connected to the processor. The memory stores instructions executed by the processor to implement a persona management service that operates to receive a request for a new email account from the client device. A new email account is created in response to the request. Cryptographic credentials for the new email account are received from the client device. The cryptographic credentials are sent to a certificate authority. A certificate authority validation is received from the certificate authority. The new email account with a cryptographic credential from the certificate authority is registered. The cryptographic credential is conveyed to the client device.

10 Claims, 11 Drawing Sheets

APPARATUS AND METHOD FOR AUTOMATING SECURE EMAIL FOR MULTIPLE PERSONAS

CROSS-REFERENCE TO RELATED APPLICATION

This application claims priority to U.S. Provisional Patent Application Ser. No. 62/399,169, filed Sep. 23, 2016, the contents of which are incorporated herein by reference.

FIELD

This invention relates generally to communications in computer networks. More particularly, this invention relates to techniques for automating secure email for multiple personas.

BACKGROUND

With the current state of identity theft, uncontrolled data collection and targeted marketing, there is a need for a user to protect his or her primary identity and to compartmentalize online and offline activity. For example, the user might prefer to use a primary identity for general browsing or reading online newspapers, separate from an identity for accessing and commenting on social media, separate from an identity for purchasing from e-commerce retailers, separate from an identity for online dating, and separate from an identity for selling items on an auction platform.

One method to achieve this separation (or compartmentalization) is to allow a user to create multiple personas and then use them for different purposes. A persona is a synthetic identity associated with a real user. Each persona has its own identity defined by a set of identity attributes, such as name, address, date of birth, phone, email, credit and delivery address. Each persona should be used for a limited and specific purpose, so that tracking of that identity would not form a complete picture of the real user's activity. Each persona acts as a personal privacy proxy, not allowing Internet services to access to the user's primary or real identity. In addition, each persona is completely separate so that an Internet service cannot correlate personas as belonging to the same user.

One of the key persona communication capabilities is email. Each persona typically requires a unique email address so that the user can communicate fully as the persona with that email address. The email address should be untraceable from the point of view of the user's primary identity as well as the user's other persona identities.

Protection from eavesdropping of the persona's email can be critical for some personas. For example, using a persona for political writing or opinions in regions of the world that do not respect human rights requires protection of that persona.

One technique to ensure protection of email is by employing cryptographic techniques to ensure end to end encryption of the email. End to end refers to the email messages being encrypted at the sender and decrypted at the receiver, with no cryptographic keys being stored on intermediate servers. This ensures that the only way for an adversary to get access to the unencrypted email is for them to get access to the devices where the emails are encrypted or decrypted. This is a much more difficult attack than being able to access unencrypted email during transit.

There are a number of end to end encrypted email solutions available including Pretty Good Privacy (PGP) and Secure MIME (S/MIME). These are used when protecting email from eavesdropping is important. S/MIME has the additional advantage of being recognized as an International Standard allowing people to choose from a range of off-the-shelf email clients to communicate securely through S/MIME.

There are a number of limitations of using S/MIME or PGP email systems today that have limited their widespread update and also make them difficult to use with multiple personas. One limitation is that current email client applications are designed for a single secure email account. This means that multiple personas cannot be easily supported in these email client applications. Another limitation is that using the system is complex and requires a user to have strong technical skills. Users typically have to request certificates from certificate authorities, install them into their email client applications, they have to be able to exchange their certificates with others users, they need to know when to encrypt/sign and so on.

Thus, there is a need for an easy to use end to end encrypted email system supporting multiple personas. Ideally, such a system would be designed to be completely automated from a user's viewpoint so that they can quickly and very simply create a new persona with email address, and that persona can immediately be provided with encrypted email capability. It also desirable to facilitate an easy exchange of certificates with other users, without requiring the user to be technically proficient.

SUMMARY

A machine has a processor and a network interface circuit connected to the processor to provide network connectivity to a client device. A memory is connected to the processor. The memory stores instructions executed by the processor to implement a persona management service that operates to receive a request for a new email account from the client device. A new email account is created in response to the request. Cryptographic credentials for the new email account are received from the client device. The cryptographic credentials are sent to a certificate authority. A certificate authority validation is received from the certificate authority. The new email account with a cryptographic credential from the certificate authority is registered. The cryptographic credential is conveyed to the client device.

BRIEF DESCRIPTION OF THE FIGURES

The invention is more fully appreciated in connection with the following detailed description taken in conjunction with the accompanying drawings, in which:

FIG. 1 is an overview of an automated persona based cryptographic email system configured in accordance with an embodiment of the invention.

FIG. 2 illustrates a system for creating an end to end cryptographic email account in accordance with an embodiment of the invention.

FIG. 3 is a sequence diagram for creating an S/MIME email account in accordance with an embodiment of the invention.

FIG. 4 is a continued sequence diagram for creating an S/MIME email account in accordance with an embodiment of the invention.

FIG. 5 is a continued sequence diagram for creating an S/MIME email account in accordance with an embodiment of the invention.

Like reference numerals refer to corresponding parts throughout the several views of the drawings.

DETAILED DESCRIPTION

Figure 1:
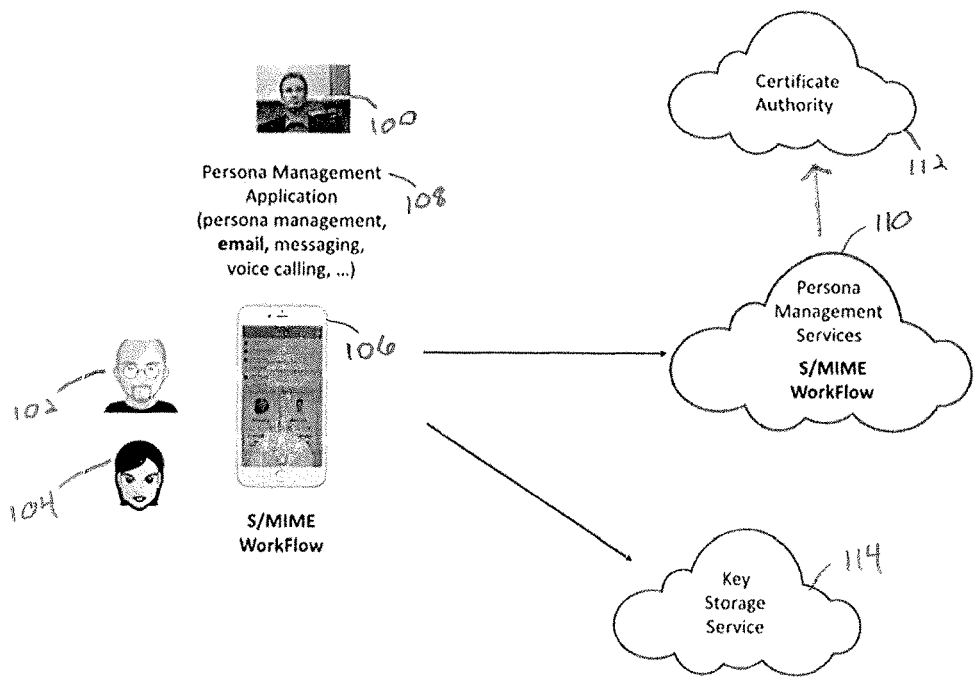

FIG. 1 illustrates a real user 100 that controls two different online personas 102 and 104. This example uses an S/MIME cryptographic email technique in connection with a client device 106 that executes a persona management application 108. Other cryptographic email techniques, such as PGP, may also be used in accordance with embodiments of the invention. The client device 106 may be a smart phone, as shown, a computer, tablet and similar devices. The client device 106 communicates with a persona management service 110. The personal management service 110 may be a server configured to implement the operations disclosed herein. The server is in network communication with the client device 106. The network communication may be facilitated by any combination of wired and wireless networks. The personal management service 110 communicates with a certificate authority 112. Since the certificate authority 112 interacts with the persona management service 110, the identity of the real user 100 cannot be traced.

In current S/MIME implementations, when a user requests an S/MIME certificate from a certificate authority for an email account, the user needs to request it/pay for it as the real user. Therefore, there is a link created between that user, their financial details and the email account they want to protect. If the user requests another S/MIME certificate for another email account, there are more links established.

With the disclosed system, there are no links established, as the certificate authority 112 is unaware of the identity of the user who is requesting the S/MIME certificate. There is no way for the certificate authority 112 to correlate a user's personas as belonging to the same user.

FIG. 1 also illustrates a key storage service 114 in communication with the client device 106. As discussed below, the key storage service 114 may be used to backup S/MIME keys and certificates.

The persona management application 108 allows the user 100 to be in control of persona information (e.g., 102, 104) by accessing online and offline services using personas. The application supports a range of persona based services particularly for communication, such as persona based SMS/MMS messaging, email and voice calling. An example of a persona management application is SudoApp® from Anonyome Labs.

The application 108 provides automation with an S/MIME Workflow that is able to provision a persona with a secure email account, create cryptographic keys for encrypted email, generate certificate signing requests, generate revocation requests, and so on.

The certificate authority 112 provides certificates for each persona email address and can also revoke those certificates. The choice of Certificate Authority (CA) depends on the intended use of the encrypted email. If it used within a closed community (e.g., the SudoApp® community), then an internal certificate authority is suitable. If communication is required outside of a closed community (e.g., Internet wide), then an externally trusted Certificate Authority (e.g., Symantec Versign CA), is more suitable.

The personal management service 110 provides persona management backend services. This includes creating an email account for each persona. It also provides the necessary email infrastructure, e.g., mail transfer agent (MTA) and mail delivery agent (MDA) for communicating via email. The persona management service 110 includes an S/MIME Workflow that provides for automating the interactions with the persona management application 108 and certificate authority 112.

The email S/MIME cryptographic keys and certificates, and the certificate revocation key can be (optionally) backed up to the key storage service 114. This ensures recovery of a user's device and supports utilization of multiple devices.

The disclosed techniques provide a high level of automation. That is, the disclosed techniques implement a complex workflow without user involvement, so that a non-technical user can be provided with persona based end to end encrypted email, without any requirement for the person to have technical skills. This is a big change to current encrypting email systems that require that the user has strong technical proficiency and understand concepts such as certificate issue and revocation.

The disclosed techniques also provide the ability of the user to have multiple personas, and for each of these personas to have its own S/MIME certificate and cryptographic keys. This is not available with current email client applications.

Figure 2:
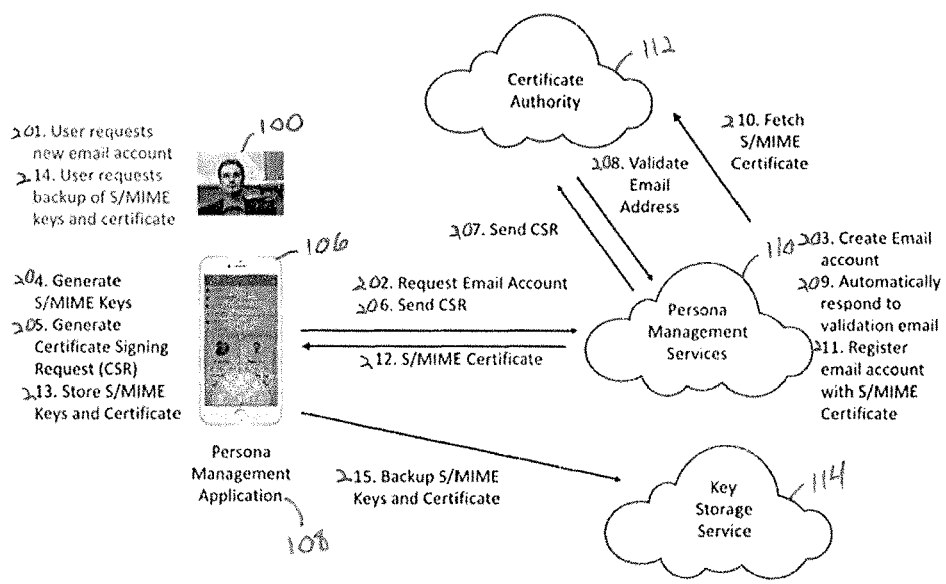

FIG. 2 shows the process to create an S/MIME email account for a persona. The whole process to create the account, cryptographic keys and certificates is fully automated such that the user's only interactions are to initially request a new email account, and then later to (optionally) backup the email account's cryptographic keys and certificates. The user has no involvement or awareness in the technical processes involved in the creation of cryptographic keys and certificates.

The user 100 requests a new email account 201 for a persona using the persona management application 108. For example, the persona management application 108 may include a menu of options, one of which is "Create New Email Account", which may be selected through the menu. In response to such a selection, the persona management application 108 sends a request 202 for a new persona email address to the persona management services 110. The persona management service 110 creates the email account 203. The persona management application 108 generates the S/MIME Keys e.g. RSA or ECC 204. The persona management application 108 also generates a Certificate Signing Request (CSR) 205. This contains the persona's S/MIME public key and other data. The CSR is sent 206 from the persona management application 108 to the persona management service 110. The persona management service 110 sends 207 the CSR to the certificate authority 112. The certificate authority validates 208 that the requesting user owns the email by sending a validation email. The persona management service 110 intercepts the validation email so that it cannot reach the user and automatically responds to the email 209.

The persona management service 110 polls the Certificate Authority to see if the S/MIME certificate has been created and fetches it 210 when ready. The persona management service 110 registers the email account with the S/MIME certificate 211. That is, the persona management service 110 keeps track of currently active S/MIME email accounts.

The S/MIME certificate is returned 212 by the persona management service 110 to the persona management application 108. The persona management application 108 stores 213 the S/MIME certificate and keys for the persona's email account in secure storage on the client device 106. The user (optionally) requests backup 215 of the S/MIME certificate and keys to the key storage service 114. This allows for device replacement, and also for multi-device scenarios.

There are two security considerations related to the S/MIME certificates that are addressed in the processing of FIG. 2. First, an attacker should not be able to request the certificate authority 112 to create S/MIME certificates for them, i.e. illegitimate certificates. This is achieved by keeping the certificate authority's account authentication key only on the persona management service 110. It is never made available to the persona management application 108 where it might be discovered. Second, an attacker should not be able to request that the certificate authority 112 revoke genuine certificates. This is achieved by having the certificate revocation key (that is specific to the S/MIME email account) stored only on the persona management application's device 106. It is this information that is required for a revocation. Therefore, to revoke a particular account's S/MIME certificate the attacker would need to attack the user's persona management application's device, making the revocation attack difficult.

Figure 3:
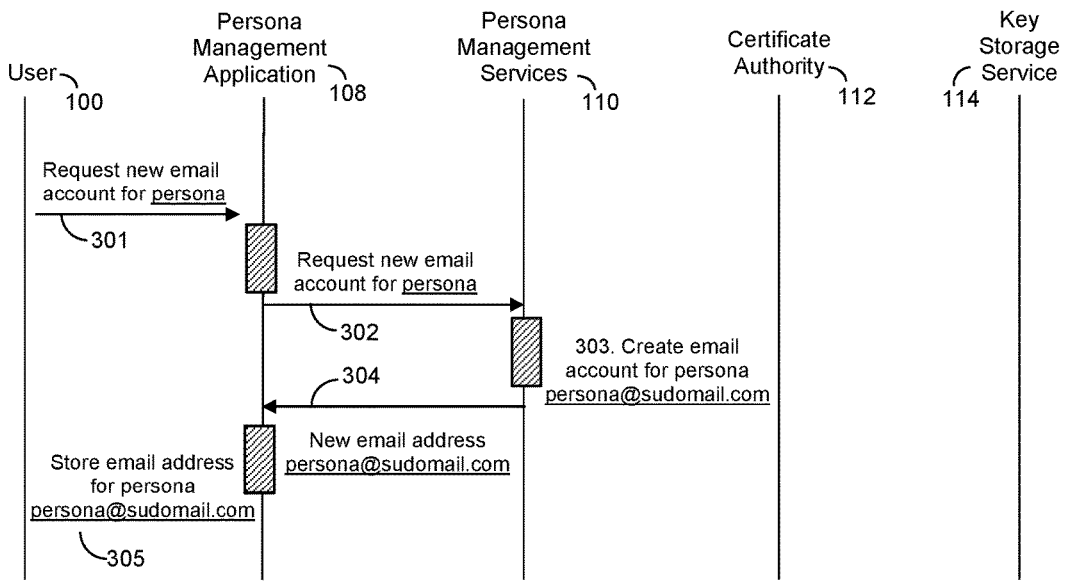

FIGS. 3-6 are sequence diagrams that provide a more detailed characterization of the process of FIG. 2. FIG. 3 shows the initial steps in the process. The user 100 requests 301 a new email address through the persona management application 108. This will usually relate to the name of their persona. The request is forwarded 302 from the persona management application 108 to the persona management service 110 for the email address. There may be some iterating between the application 108 and the service 110 where the user is allowed to pick from available email addresses.

Once the user has decided on an email address, an account is created 303 for the email address in the persona management service 110. A new email address is returned 304 from the persona management service 110 to the persona management application 108. The new email address is stored 305 in the persona management application 108.

Figure 4:
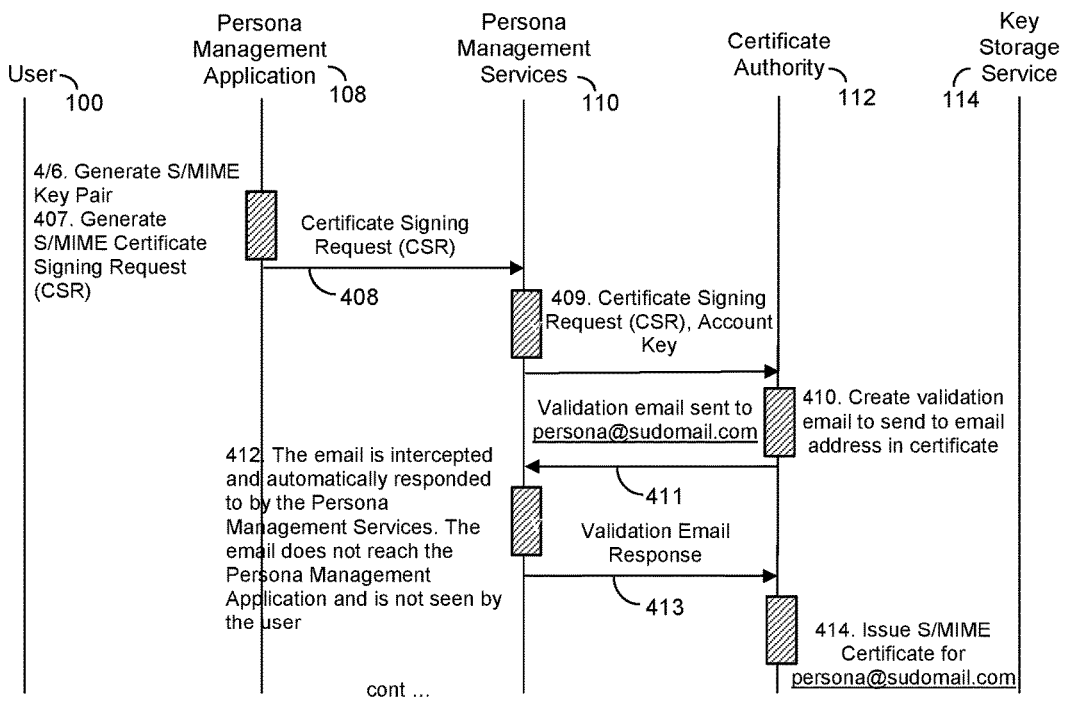

FIG. 4 shows the next sequence of steps. The persona management application 108 creates 406 the S/MIME key pair. This is usually either an RSA key pair or Elliptic Curve key pair. The persona management application generates a Certificate Signing Request (CSR) 407. This is the requesting file to the certificate authority to create the S/MIME certificate. In one embodiment, the CSR contains the following values: public key, email address and name. The CSR is sent 408 from the persona management application 108 to the persona management service 110.

The CSR is sent 409 from the persona management service 110 to the certificate authority 112. The certificate authority 112 authenticates the request as being from an authorized entity. The certificate authority 112 generates a validation email 410 to send 411 to the email address in the CSR. This way the certificate authority 112 knows that the email address is in control of the requestor. The validation email is sent to the email address in the CSR. The validation email arrives at the persona management service 110. That is, the email is not forwarded to the persona management application 108. Therefore, the user is unaware of it, i.e., this level of complexity should not be visible to a normal user. Rather, a validation email response 413 is produced by the persona management service 110.

Now that the certificate authority 112 has proven that the email address is in control of the requestor, it issues 414 the signed S/MIME certificate for the email account.

Figure 5:
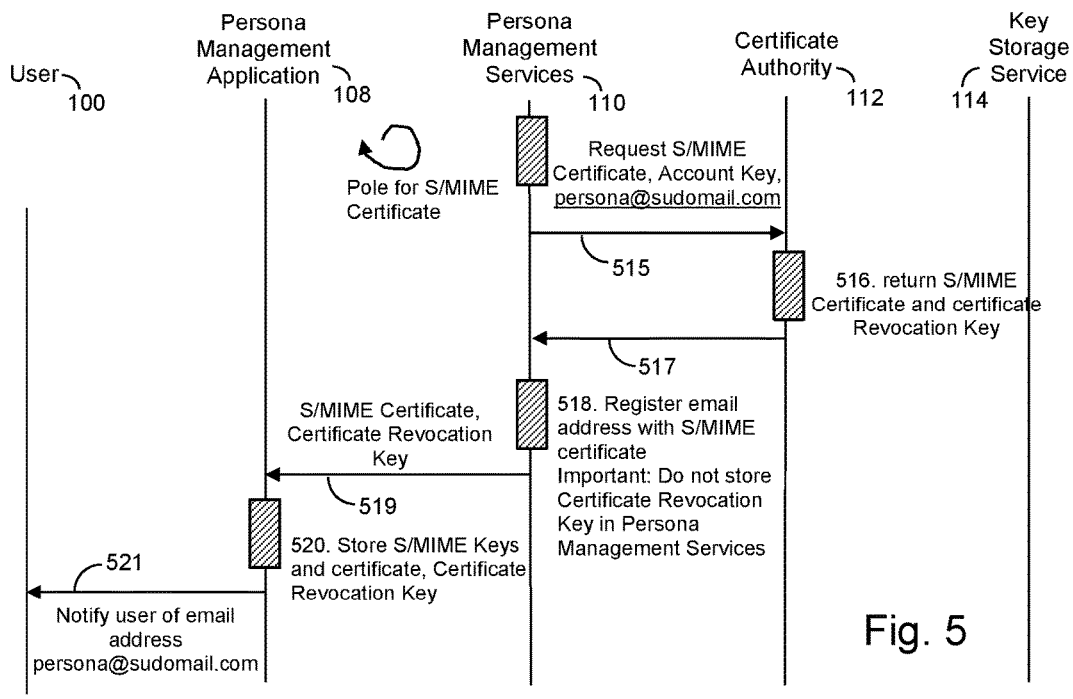

FIG. 5 shows the next sequence of steps. The persona management service 110 requests 515 the S/MIME certificate for the email address from the certificate authority 112. The persona management service 110 may need to poll the certificate authority 112 at regular intervals until the certificate has been created. The certificate authority 112 collects the S/MIME certificate and generates a certificate revocation key (which is required later to revoke the certificate). The certificate authority 112 returns 516 the S/MIME certificate and certificate revocation, key to the persona management service 110.

The persona management service 110 registers 518 the email address and S/MIME certificate as being active for S/MIME encryption. The persona management service 110 does not store the certificate revocation key on its server. This is so an attacker cannot recover this information for all S/MIME certificates from the persona management service 110.

The S/MIME certificate and the certificate revocation key are returned 519 by the persona management service 110 to the persona management application 108. The persona management application 108 stores 520 the S/MIME keys and certificate, and the certificate revocation key. This facilitates subsequent revocation of the certificate. The persona management application 108 notifies 521 the user of the new email address. For example, the notification may be an email displayed on the client device 106.

Figure 6:
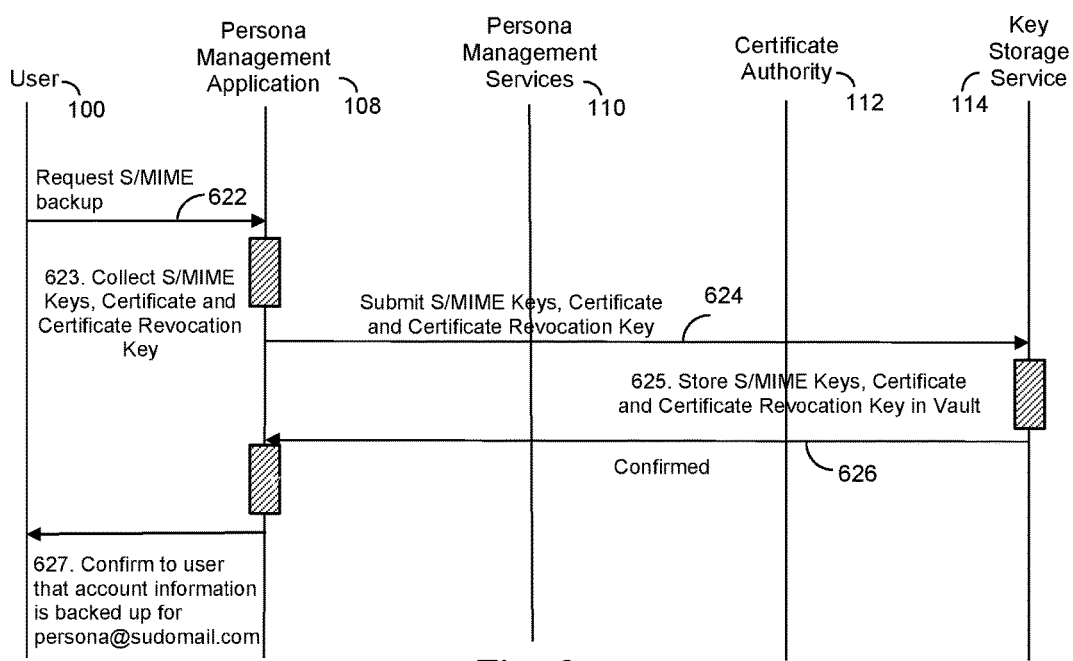
FIG. 6 is a continued sequence diagram for creating an S/MIME email account in accordance with an embodiment of the invention.

FIG. 6 shows the final sequence of steps. This part is optional for the user and depends on whether the user wants to keep a backup for restoration to a new device, or for a multi-device scenario. The user requests 622 the persona management application 108 to backup the S/MIME data. The persona management application 108 collects 622 the S/MIME keys, certificate and certificate revocation key.

The persona management application 108 submits 624 the information to the key storage service 114. The key storage service 114 stores 625 the information in a vault for the email account. The key storage service 114 confirms 626 with the persona management application 108 that it has stored the data. The persona management application 108 sends a confirmation 627 to the user that the email account information is backed up.

Figure 7:
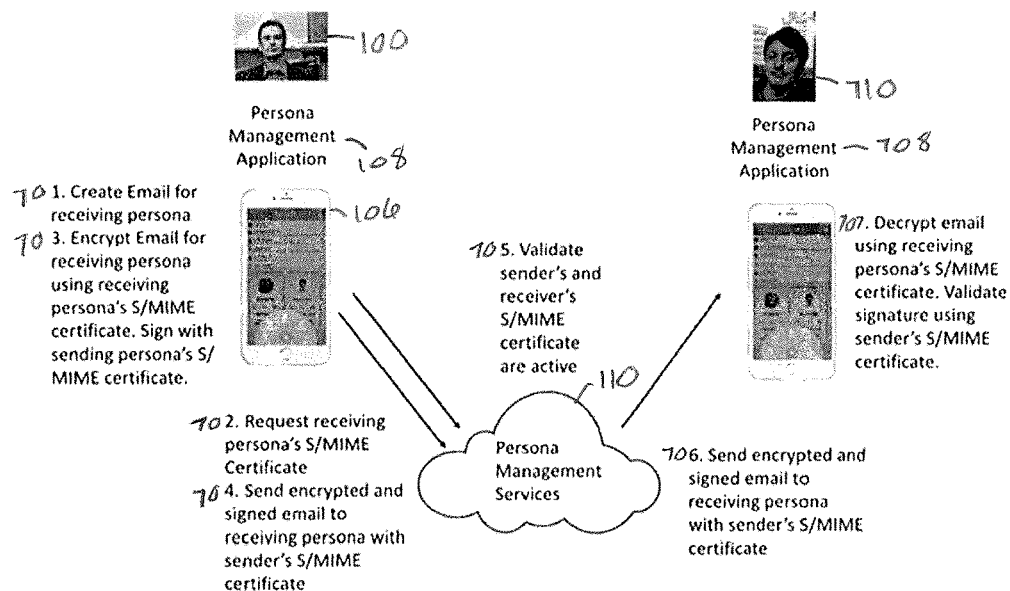
FIG. 7 illustrates encrypting and signing of an in-network outgoing email in accordance with an embodiment of the invention.

FIG. 7 shows the process to encrypt and sign an outgoing S/MIME email for persona to persona emailing. This is the in-network case where both parties have the persona management application 108 and are using personas. The whole process is fully automated such that the sending user's only interaction is to initially create a new email. The user has no involvement or awareness in the technical processes involved in the encrypting or signing. The same occurs for the receiving persona. All steps such as checking a signature, decrypting the email and validating the sender is still active are left to the persona management application 108.

The sequence is as follows. The user 100 creates an email in the persona management application 108 for one persona (e.g., 102 or 104). In this example, the sequence is for in-network emailing, meaning the receiver also has a persona, and the receiving user 710 also has the persona management application 708.

An email is created by the sending persona for the receiving persona 701. The persona management application 108 requests 702 the receiving persona's S/MIME certificate from the persona management service 110. The outgoing email is encrypted 704 with the receiving persona's S/MIME certificate and signed with the sending persona's S/MIME certificate. The outgoing email is sent from the persona management application 108 to the persona management service 110. The persona management server 110 validates 705 that both the sender's and receiver's S/MIME certificates are active. If either account is no longer active then the email will go no further.

The outgoing signed and encrypted email is sent from the persona management service 110 to the persona management application 708 of the receiving persona. The persona management application 708 decrypts 707 the email using the receiving persona's S/MIME certificate. The email's signature is validated using the sender's S/MIME certificate.

Figure 8:
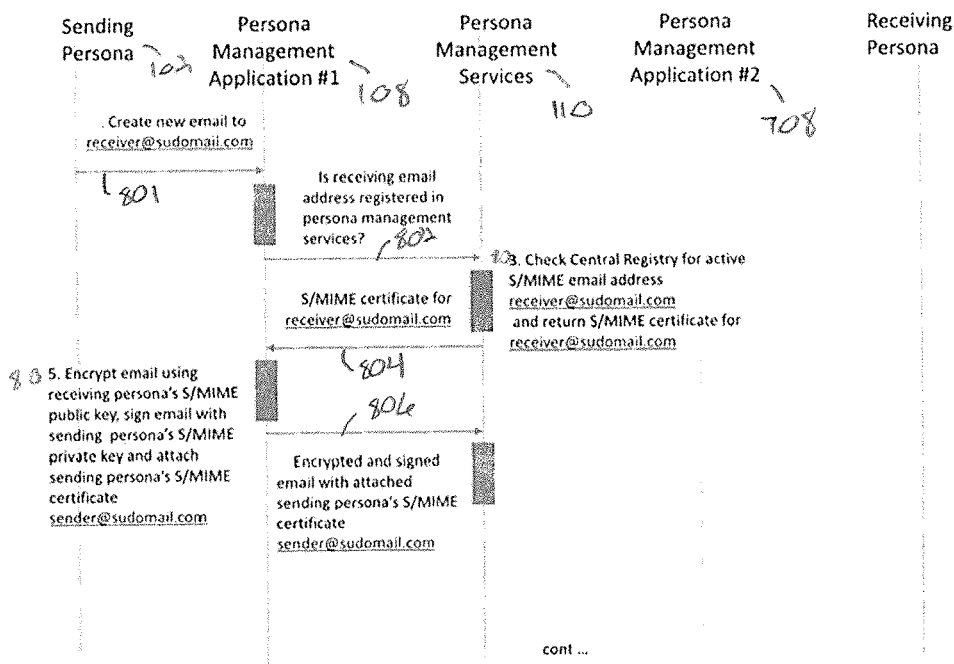
FIG. 8 is a sequence diagram for encrypting and signing an in-network outgoing email in accordance with an embodiment of the invention.
Figure 9:
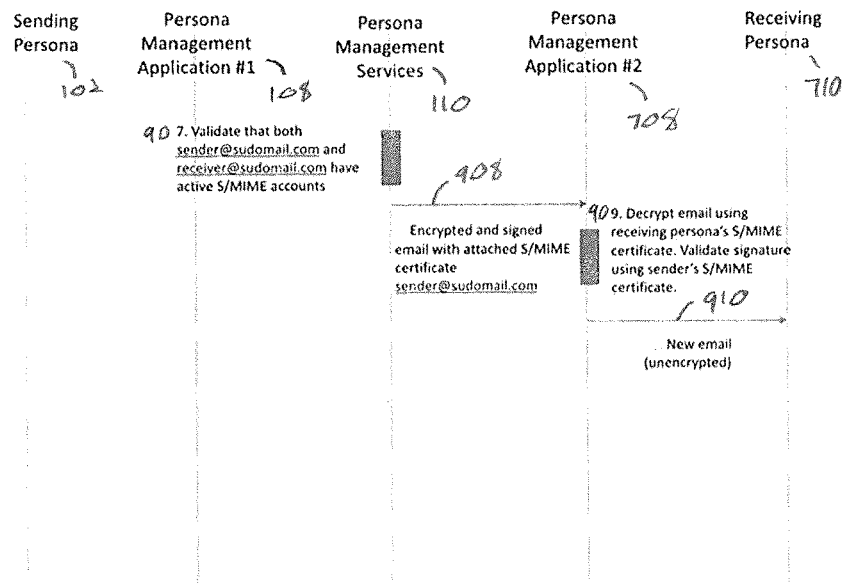
FIG. 9 is a continued sequence diagram for encrypting and signing an in-network outgoing email in accordance with an embodiment of the invention.

FIGS. 8-9 show this processing through sequence diagrams. The sending persona 102 uses the persona management application 108 to create 801 an outgoing email for a receiver. The persona management application queries 802 the persona management service 110 to check if the receiving email address is an active S/MIME account.

The persona management service 110 checks 803 that the receiving email address is for a persona with an active S/MIME account. If it is, then the persona management service returns 804 the receiving persona's S/MIME certificate. If not, then the persona management service 110 informs the persona management application 108 that it should be treated as an out-of-network email address. The receiving persona's S/MIME certificate is returned by the persona management service 110 to the persona management application 108.

In the persona management application 108, the outgoing email is encrypted with the receiving persona's S/MIME public key and it is also signed with the sending persona's S/MIME private key 805. The sending persona's S/MIME certificate is attached to the email. The encrypted and signed email is sent 806 from the persona management application 108 to the persona management service 110.

FIG. 9 shows the final sequence of steps. The persona management service 110 validates that both the sending persona and receiving persona have active S/MIME accounts 907. If not, then the email does not go any further and the sender receives an error.

The persona management service 110 sends 908 the encrypted and signed email to the persona management application 708 of the receiving persona. The persona management application 708 decrypts 909 the email using the receiving persona's S/MIME private key. It validates the signature using the sending persona's public key. The decrypted email is presented 910 to the receiving persona.

Figure 10:
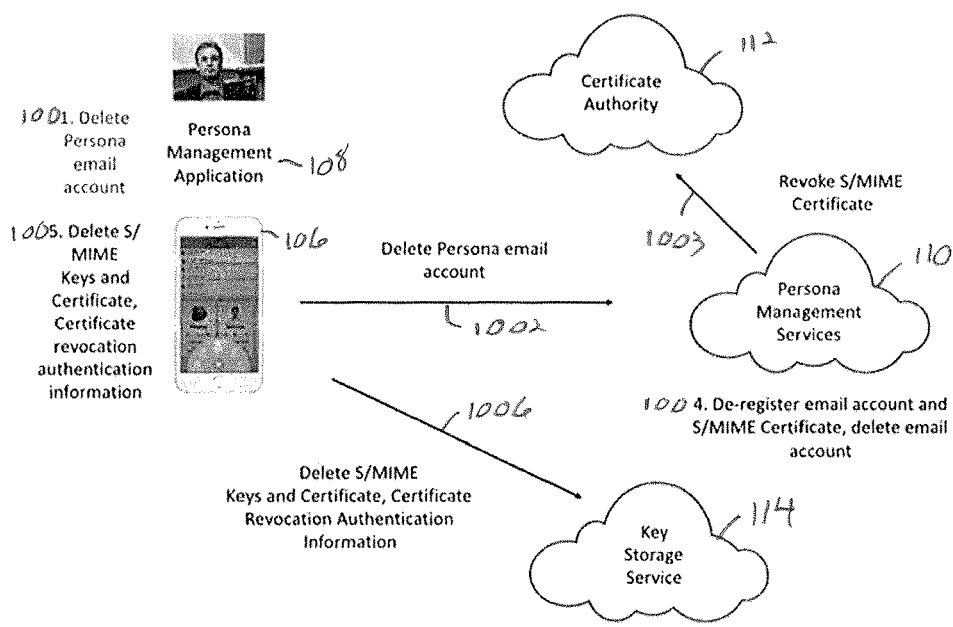
FIG. 10 illustrates deleting of a persona email account in accordance with an embodiment of the invention.

FIG. 10 shows the process of deleting a persona S/MIME email account. The whole process is fully automated such that the user's only interaction is to initially choose to delete their email account. The user has no involvement or awareness in the technical processes involved in the deleting the email account, de-registering the account from the backend, and revoking the S/MIME certificate.

The sequence is as follows. The user selects to delete their persona's S/MIME email account 1001 on the persona management application 108. For example, the persona management application 108 may include a menu of operations to perform, one of which may be to delete an email account. After selection of such an option, a menu of existing accounts may be presented, which allows the user to select an email account for deletion.

The persona management application 108 informs 1002 the persona management service 110 to delete the email account. The account deletion command includes certificate revocation authentication information. The persona management service 110 requests 1003 the certificate authority 112 to revoke the certificate. The persona management service 110 de-registers 1004 the email account and S/MIME certificate (i.e., designates them as no longer active).

The persona management application 108 deletes the email accounts S/MIME keys, certificate and certificate revocation key from the device 1005. If there is a backup of the data in the key storage service 114, the persona management application 108 requests the data be deleted 1006.

Figure 11:
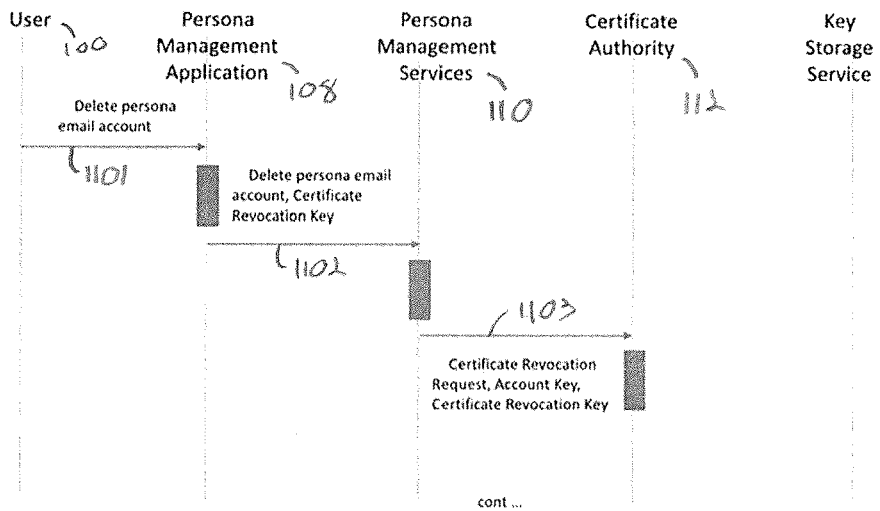
FIG. 11 illustrates a sequence diagram for deleting a persona S/MIME email account in accordance with an embodiment of the invention.
Figure 12:
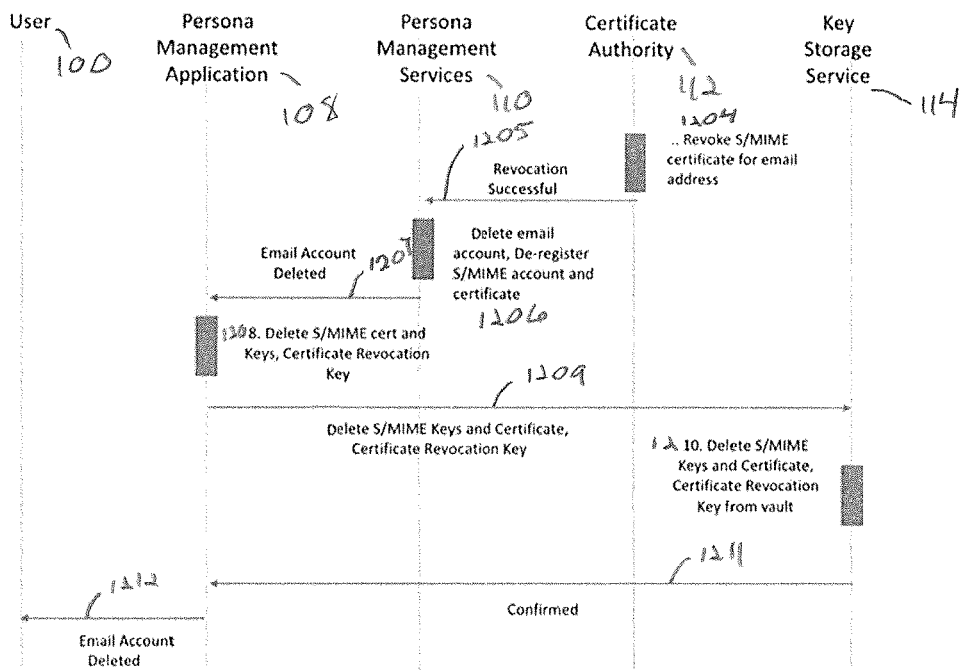
FIG. 12 illustrates a continued sequence diagram for deleting a persona S/MIME email account in accordance with an embodiment of the invention.

FIGS. 11-12 show these operations as sequence steps. The user 100 uses the persona management application 108 to designate a persona email account for deletion 1101. The persona management application 108 sends the deletion request 1102 to the persona management service 110. The request includes the certificate revocation key that allows the persona management service 110 to request revocation of the S/MIME certificate. The persona management service 110 request revocation 1103 of the S/MIME certificate by providing the account key and certificate revocation Key to the certificate authority 112.

FIG. 12 shows the final sequence of steps. The certificate authority 112 revokes 1204 the S/MIME email account certificate. The certificate authority 112 communicates to the persona management service 110 the successful revocation 1205. The persona management service 110 deletes 1206 the email account, and de-registers the S/MIME email account and certificate. The persona management service 110 indicates 1207 to the persona management application that the email account has been deleted and de-registered. The persona management application 108 deletes 1208 the local S/MIME certificate, S/MIME keys, and certificate revocation key. If the user had backed up the local S/MIME data to the key storage service 114, then the persona management application 108 requests this information be deleted 1209. The key storage service 114 deletes the S/MIME data 1210. The key storage service 114 confirms 1211 to the persona management application 108 that the data has been deleted. The user is informed 1212 by the persona management application 108 that the email account is deleted. Note that because the whole process is automated, the user does not need to know anything about the use of keys and certificates.

Figure 13:
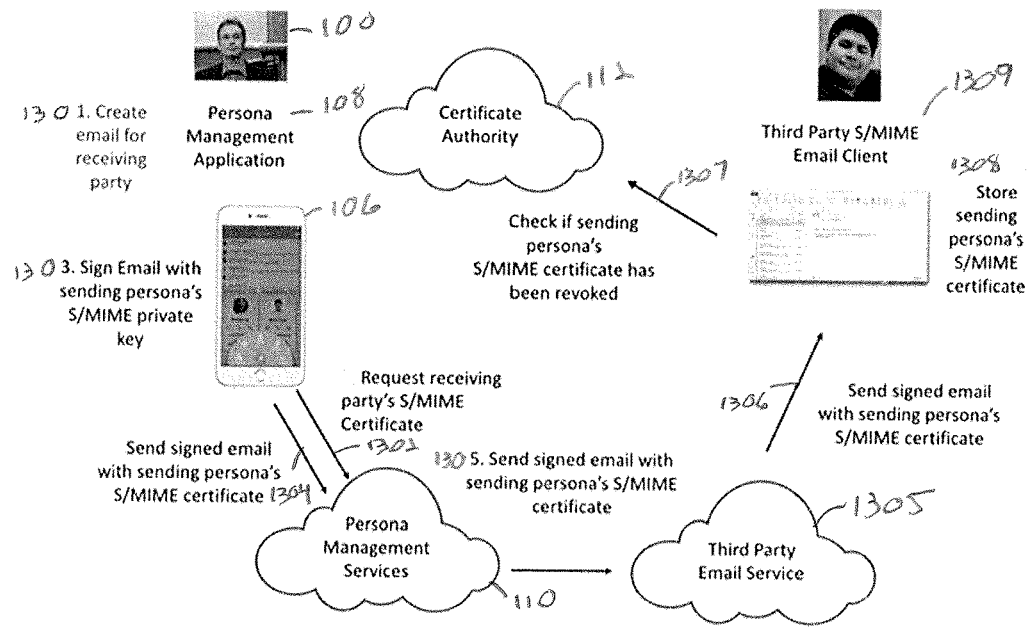
FIG. 13 illustrate exporting a persona email account S/MIME certificate to an out of network participant in accordance with an embodiment of the invention.

Attention now turns to techniques for sending an end to end encrypted email from a persona to an out of network party. FIG. 13 begins the process to exchange a S/MIME certificate with an out of network party. In this example, the receiving party is not known to the persona, i.e., there is no S/MIME certificate stored in the persona's contacts for the receiver's email address. As before, the whole process is fully automated such that the user's only interaction is to initially choose to create an email. The user has no involvement or awareness in the technical processes involved: detecting this as an out of network email address, which the first email needs to be signed so that the participants can exchange S/MIME certificates, and so on.

The user 100 creates an email from a persona to the receiving party 1301 using the persona management application 108. The term receiving party is used as the receiver is not using the personal management application 108 and is not using a persona. The persona management application 108 requests the receiving party's S/MIME email certificate 1302 from the persona management service 110. The persona management service 110 replies that the email account is not a registered S/MIME account.

The persona management application 108 has no way to encrypt an email to the receiving party as it does not have the receiving party's S/MIME certificate. Instead the persona management application signs the email with sending persona's S/MIME private key 1303.

The persona management application 108 sends the signed email along with the sending persona's S/MIME certificate 1304 to the persona management service 110. The persona management service 110 sends the signed email and the sending persona's S/MIME certificate to a third party email service 1305. The third party email service 1305 sends the signed email with the sending persona's S/MIME certificate 1306 to a third party email client 1309, e.g., Microsoft® Outlook® client.

The third party email client 1309 (optionally) checks with the certificate authority 112 to determine if the sending persona's S/MIME certificate has been revoked 1307. The third party email client displays the email, giving the receiving party the option to store the S/MIME certificate 1308 in the contact for the sending persona.

Figure 14:
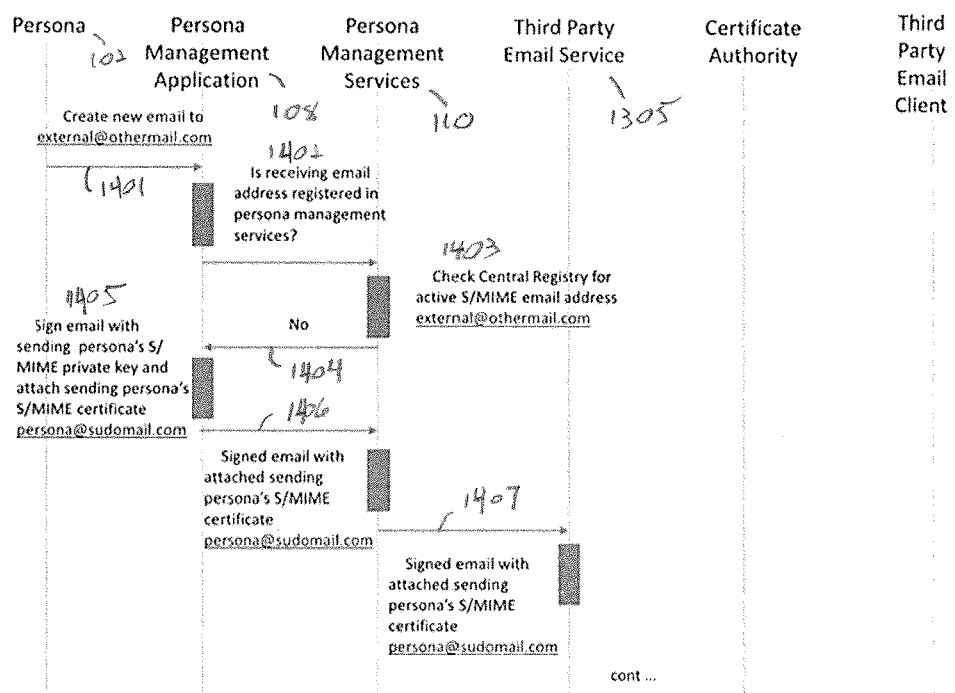
FIG. 14 is a sequence diagram for exchanging S/MIME email account certificates in accordance with an embodiment of the invention.

FIG. 14 shows a more detailed view of the initial steps in the process. The user has a persona 102 create 1401 an email to the receiving party using the persona management application 108. The persona management application 108 requests 1402 the receiving party's S/MIME certificate from the persona management service 110. The persona management service 110 checks if the receiving party's email address and S/MIME certificate is registered 1403.

The persona management service 110 responds to the persona management application 108 that the email address and S/MIME certificate are not registered 1404. The persona management application 108 now knows that it is an external email address. Because the persona management application does not have the receiving party's S/MIME certificate stored in its persona's contacts it cannot encrypt the email. Instead it signs the email with the sending persona's private key 1405. It attaches the sending persona's S/MIME certificate to the email.

The signed email and the sending persona's S/MIME certificate are sent 1406 from the persona management application 108 to the persona management service 110. The signed email and the sending persona's S/MIME certificate are sent 1407 from the persona management service 110 to the third party email service 1305.

Figure 15:
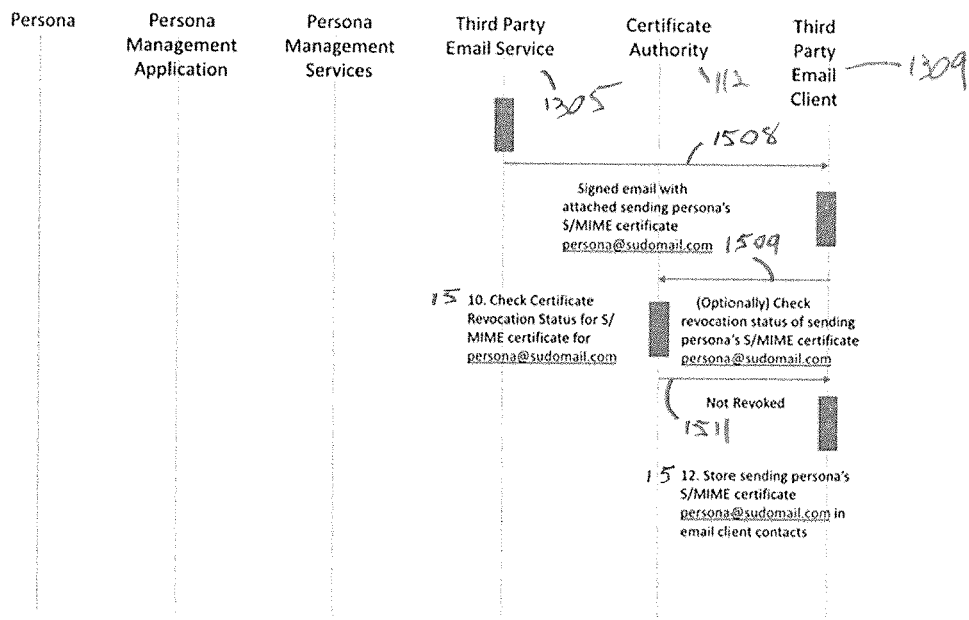
FIG. 15 is a continued sequence diagram for exchanging S/MIME email account certificates in accordance with an embodiment of the invention.

FIG. 15 shows a more detailed view of the final sequence of steps. The third party email client 1309 fetches the signed email and the sending persona's S/MIME certificate 1508 from the third party email service 1305. The third party email client 1309 recognizes the sending persona's S/MIME certificate and (optionally) checks 1509 if the certificate is not revoked by communicating with the certificate authority 112. The certificate authority 112 checks to determine whether the S/MIME certificate is revoked 1510. The certificate authority 112 informs the third party email client 1309 that the certificate is not revoked 1511. The receiving party has the opportunity to store the sending persona's S/MIME certificate 1512 in the receiving party's email client contact list. The receiving party is able to read the email.

Figure 16:
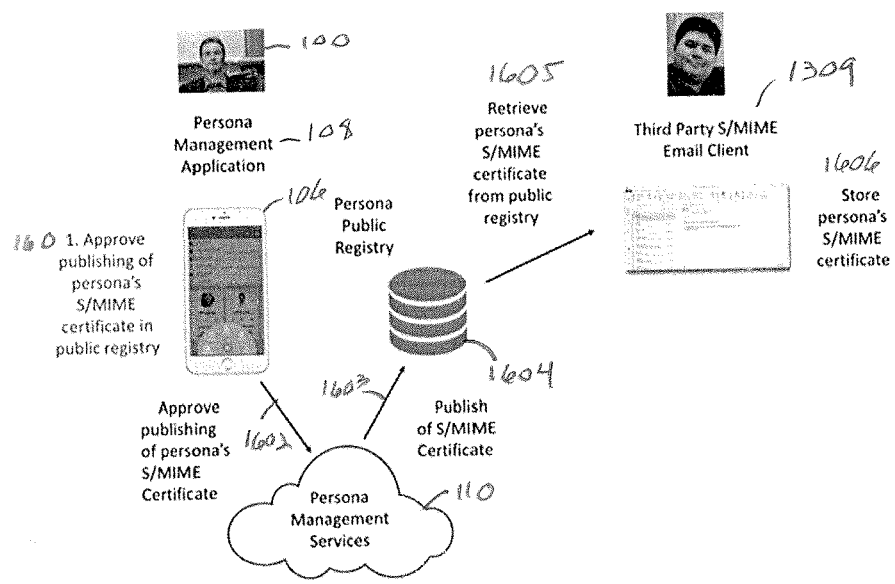
FIG. 16 illustrates an alternate method for exporting a persona email account S/MIME certificate to an out of network participant in accordance with an embodiment of the invention.

FIG. 16 shows an alternate way for a persona S/MIME certificate to be exported to a third party client. In this scenario, the user exports their persona's S/MIME certificate to a persona public registry. The third party can then retrieve the persona's S/MIME certificate from the persona public registry.

The user 100 approves 1601 of the publishing of a persona's S/MIME certificate to the persona public registry 1604. The persona management application communicates 1602 the approval to the persona management service 110. The persona management service 110 publishes the S/MIME certificate 1603 to a persona public registry 1604. The registry might be managed by the persona management service 1604, or could be a third party S/MIME certificate registry.

The third party email client 1309 retrieves 1605 the persona's S/MIME certificate from the public registry 1604. The third party email client 1309 stores 1606 the persona's S/MIME certificate in the contact address book of the email client.

Figure 17:
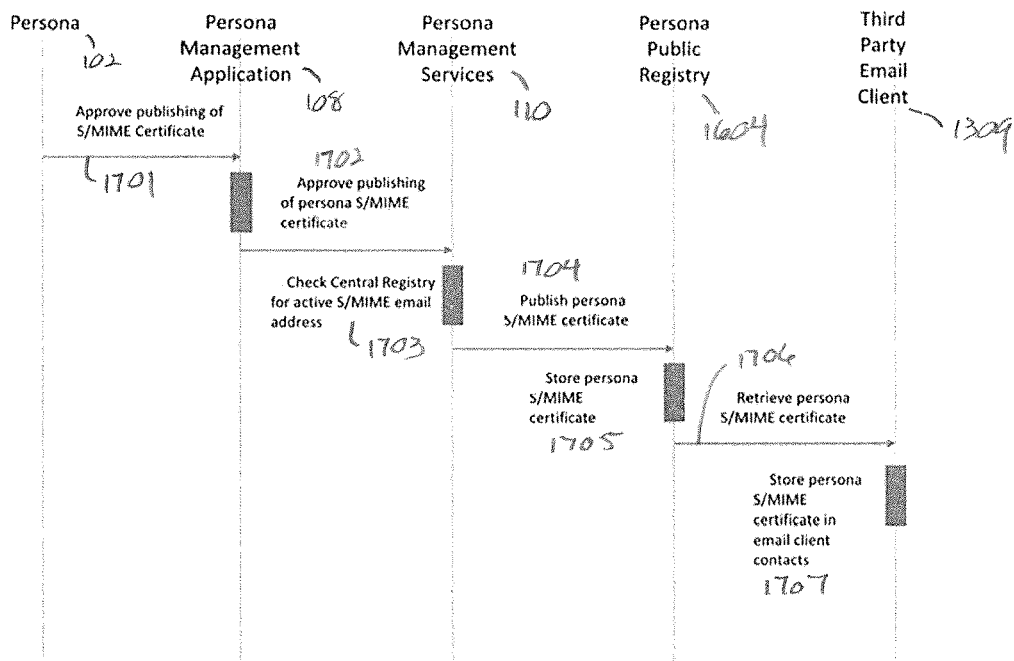
FIG. 17 is a sequence diagram for an alternate method of exporting a persona email account S/MIME certificate to an out of network participant in accordance with an embodiment of the invention.

FIG. 17 shows a more detailed view of the process. The persona 102 approves publishing of its S/MIME certificate 1701 using the persona management application 108. This might be a check box or similar prompt in the application that gives the user the choice of whether to make the S/MIME certificate searchable by third party users.

The persona management application communicates the approval 1702 to the persona management service 110. The persona management service 110 checks whether the S/MIME certificate is still active in its central registry 1703. The persona management service 110 communicates with the persona public registry 1604 to publish the S/MIME certificate 1704.

The persona public registry 1604 stores the S/MIME certificate 1705 and makes it searchable. The third party email client 1309 retrieves the S/MIME certificate 1706 from the persona public registry 1604. The third party email client 1309 stores the persona's S/MIME certificate in the third party email client address book 1707

Figure 18:
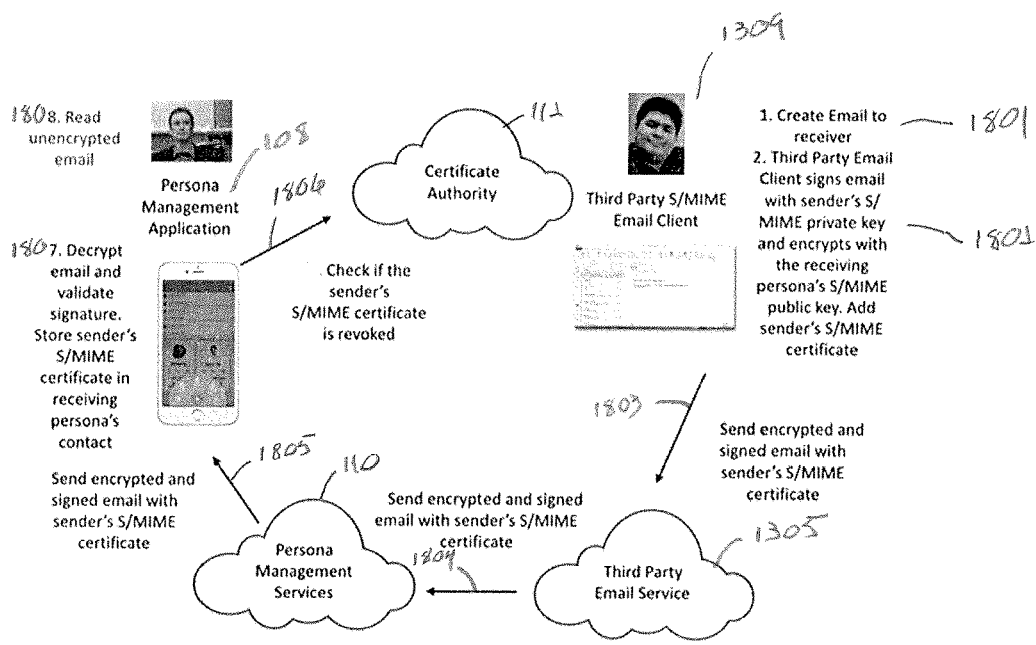
FIG. 18 illustrates importing an out of network participant S/MIME certificate in accordance with an embodiment of the invention.

FIG. 18 shows the second half of the process when the persona wants to import the S/MIME certificate of an out of network participant. The whole process is again fully automated such that the user's only interaction is to receive the email. The user has no involvement or awareness in the technical processes involved: receiving the encrypted and signed email, checking the signature, checking if the certificate is revoked, and so on.

The out of network participant (now the sender) creates an email destined for the receiving persona 1801. The third party email client 1309 signs the email with the sender's S/MIME private key and encrypts the email with the receiving persona's S/MIME public key 1802. The third party email client 1309 sends the encrypted and signed email with the sender's S/MIME certificate 1803 to the third party email service 1305.

The third party email service 1305 sends the encrypted and signed email with the sender's S/MIME certificate 1804 to the persona management service 110. The persona management service 110 sends the encrypted and signed email with the sender's S/MIME certificate 1805 to the persona management application 108.

The persona management application 108 (optionally) checks if the sender's S/MIME certificate has been revoked 1806 by communicating with the certificate authority 112. The persona management application 108 decrypts the email, checks the signature, and stores the sender's S/MIME certificate in a contact list 1807. The user is able to read the email at this point.

Figure 19:
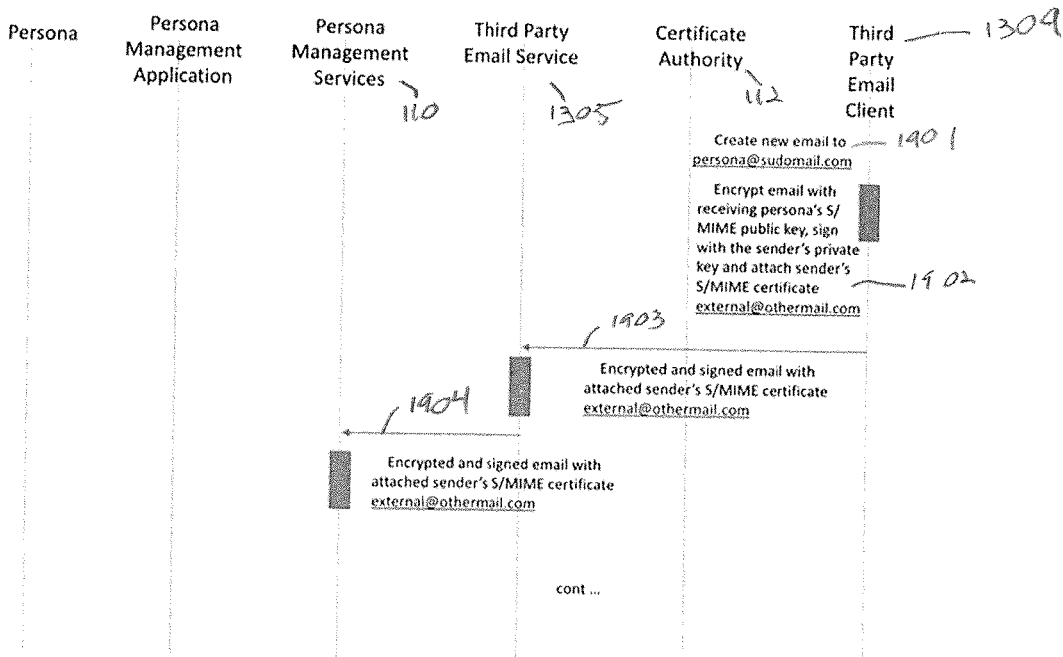
FIG. 19 is a sequence diagram for exchanging S/MIME email account certificates in accordance with an embodiment of the invention.

FIG. 19 shows a more detailed view of the initial steps in the process. The out of network participant uses their third party email client 1309 to create a new email to the persona 1901. The third party email client encrypts the email with the receiving persona's S/MIME public key (the receiving persona's S/MIME certificate was previously stored in the persona's contact), and signs the email with the sender's S/MIME private key and attaches the sender's S/MIME certificate 1902.

The third party email client 1309 forwards the encrypted and signed email with the attached sender's S/MIME certificate 1903 to the third party email service 1305. The third party email service 1305 forwards the encrypted and signed email with attached sender's S/MIME certificate 1904 to the persona management service 110.

Figure 20:
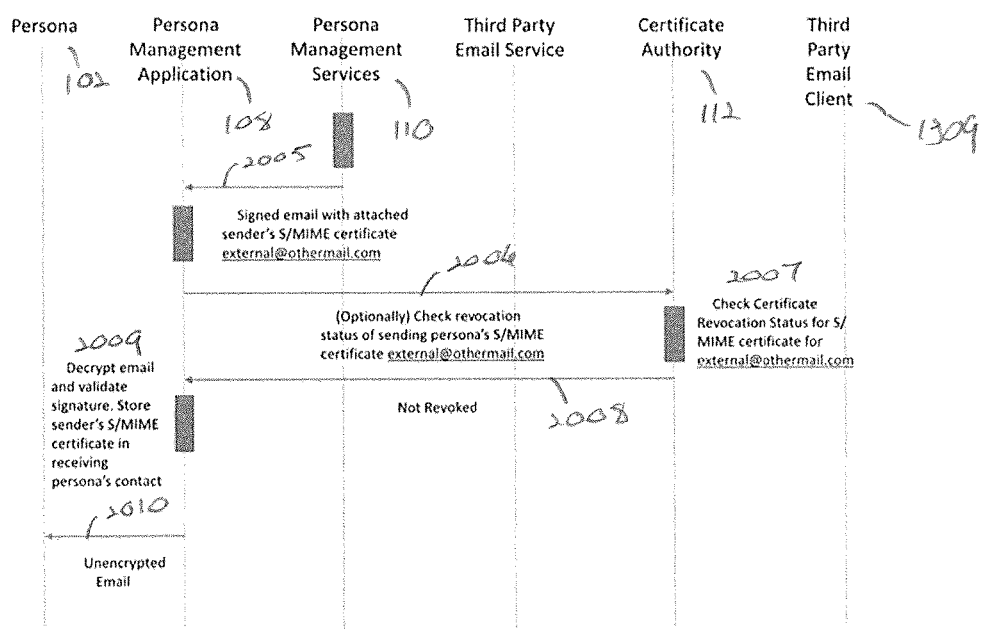
FIG. 20 is a continued sequence diagram for exchanging S/MIME email account certificates in accordance with an embodiment of the invention.

FIG. 20 shows the final steps in the process. The persona management service 110 forwards the encrypted and signed email with attached sender's S/MIME certificate 2005 to the persona management application 108. The persona management application 108 (optionally) checks 2006 with the certificate authority 112 if the sender's S/MIME certificate has been revoked. The certificate authority 112 checks the revocation status for the S/MIME certificate 2007. The certificate authority 112 responds 2008 to the persona management application 108 that the certificate is not revoked. The persona management application decrypts the email, validates the signature and stores the sender's S/MIME certificate in the receiving persona's contacts 2009. The unencrypted email is supplied 2010 to the persona 102.

Figure 21:
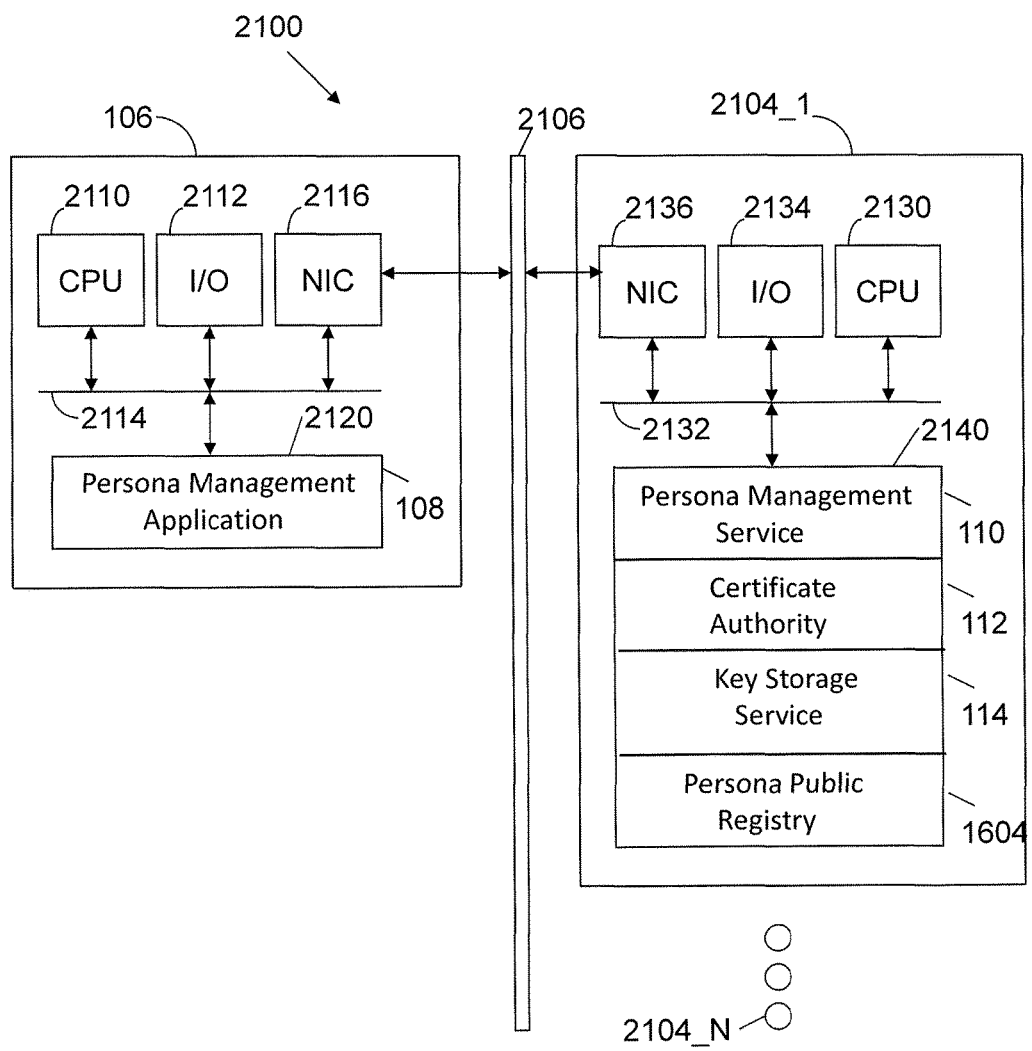
FIG. 21 is a network configured in accordance with an embodiment of the invention.

FIG. 21 illustrates a network 2100 configured in accordance with an embodiment of the invention. The network 2100 includes client device 106 in communication with one or more servers 2104_1 through 2104_N via a network 2106, which may be any combination of wired and wireless networks.

The client device 106 includes a central processing unit 2110 connected to input/output devices 2112 via a bus 2114. The input/output devices 2112 may include a keyboard, mouse, touch display and the like. A network interface circuit 2116 is also connected to the bus 2114 to provide connectivity to network 2106. A memory 2120 is also connected to the bus 2114. The memory 2120 stores a persona management application 108, which includes instructions executed by the central processing unit 2110 to implement the operations disclosed herein.

The server 2104_1 also includes a central processing unit 3130, a bus 2132, input/output devices 2134, a network interface circuit 2136 and a memory 2140. The memory 2140 stores a persona management service 110, certificate authority 112, key storage service 114 and persona public registry 1604. Each module stored in memory 2140 includes instructions executed by the central processing unit 2130 to implement the respective functions disclosed herein. The configuration of FIG. 21 is a simplification of a more typical deployment in which each module 110, 112, 114 and 1604 is implemented on a separate server. The modules on the separate servers communicate via network 2106 to implement the operations disclosed herein.

It is noteworthy that each persona has its own address book or contact list. The address book is used to store keys and certificates of the persona and all individuals they communicate with. Because current email client implementations are designed around one user identity, there is no way to segment the different personas, such that each persona's S/MIME capable email account has its own address book with its own S/MIME certificate and keys and the S/MIME certificates of users associated with that account.

The lack of segmentation means that a user may inadvertently use the wrong email address to send a secure email to an outside user, as the S/MIME certificates of the user being communicated with are available to all personas. This may lead to the user to persona, and persona to persona relationships, inadvertently being disclosed.

A person's connections in an encrypted environment have more significance when dealing with more than one certificate and email address and sets of recipients in independent address books. Suppose a user does not wish to advertise their public certificates in a registry. Instead, the user only wants to give out this information to another in a manual exchange (the analogy would be an exchange of business cards). If the user inadvertently sends an encrypted email from one email address to a person that they have been conversing with via a completely different email address, then the recipient is not likely to have the originating email address's certificate. This means that the recipient loses the ability to communicate with that user if they do not make the connection. Therefore, the communication ceases, a reply is made via an unencrypted message or the identity associative link is highlighted since the recipient must make the cognitive connection to reply. The disclosed solution avoids this problem.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A machine, comprising:
a processor;
a network interface circuit connected to the processor to provide network connectivity to a client device; and
a memory connected to the processor, the memory storing instructions executed by the processor to implement a persona management service that operates to:
receive a request for a new email account from the client device, wherein the request for the new email account is a request for a persona associated with a real user, wherein the real user has a plurality of personas and wherein each persona has a unique set of identity attributes maintained by the persona management service,
create a new email account in response to the request,
receive from the client device cryptographic credentials for the new email account,
send the cryptographic credentials to a certificate authority,
receive a certificate authority validation from the certificate authority,
register the new email account with a cryptographic credential from the certificate authority, and
convey the cryptographic credential to the client device;
receive from the client device a request for a recipient cryptographic certificate for an email recipient,
supply to the client device the recipient cryptographic certificate, and
send an encrypted and signed email to the email recipient that includes a sender cryptographic certificate.

2. The machine of claim 1 wherein the cryptographic credentials for the new email account include a certificate signing request.

3. The machine of claim 1 wherein the cryptographic credential is a signing certificate.

4. The machine of claim 3 in combination with the client device, wherein the client device includes instructions executed by a client processor to store cryptographic keys and the signing certificate.

5. The machine of claim 4 wherein the client device includes instructions executed by the client processor to send the cryptographic keys and signing certificate to a network connected key storage service.

6. The machine of claim 1 wherein each persona has a separate contact list.

7. The machine of claim 1 wherein the memory stores instructions executed by the processor to:
receive from the client device a request to delete the new email account,
send to the certificate authority a revoke certificate received from the client device, and
delete the new email account.

8. The machine of claim 1 wherein the memory stores instructions executed by the processor to:
receive from the client device an email signed with a sender private key, wherein the email includes a sender cryptographic certificate, and
send the email signed with the sender private key and the sender cryptographic certificate to a third party email service.

9. The machine of claim 1 wherein the memory stores instructions executed by the processor to:
receive from the client device approval of publication of a persona cryptographic certificate, and
publish the persona cryptographic certificate to a network connected public registry.

10. The machine of claim 1 wherein the memory stores instructions executed by the processor to:
receive an encrypted email from an email sender, wherein the encrypted email is signed with a private key of an email sender, is encrypted with a public key for an email recipient, and includes a cryptographic certificate for the email sender, and
send the encrypted email to the client device.

* * * * *